(No Model.)

F. H. CILLEY.
SPRING TONGS OR FORK.

No. 284,118. Patented Aug. 28, 1883.

Witnesses
G. B. Maynadier
John R. Snow

Inventor
Frank H. Cilley
by J. E. Maynadier
his Atty

UNITED STATES PATENT OFFICE.

FRANK H. CILLEY, OF BOSTON, MASSACHUSETTS.

SPRING TONGS OR FORK.

SPECIFICATION forming part of Letters Patent No. 284,118, dated August 28, 1883.

Application filed March 7, 1883. (No model.)

*To all whom it may concern:*

Be it known that I, FRANK H. CILLEY, of Boston, in the county of Suffolk and State of Massachusetts, have invented certain new and useful Improvements in Spring Tongs or Forks, of which the following is a specification.

My invention relates to improvements in tongs or forks, more especially adapted for domestic uses, of the class in which two tines are caused to approach each other, when left free, by means of a spring.

The object of my invention is to dispense with the pivot-connections heretofore employed, and thereby simplify the construction and increase the durability by reducing the number of wearing parts.

To attain this object my invention consists in making the tines themselves the springs, and in forming the tines from a hollow handle, or an actuating-rod inclosed in the hollow handle, or in securing spring-tines firmly to the hollow handle or the inclosed rod by means of immovable connections—such as solder, rivets, or welding.

Figure 1:
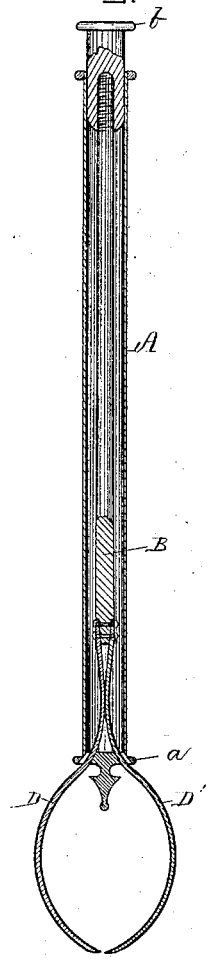
Figure 2:
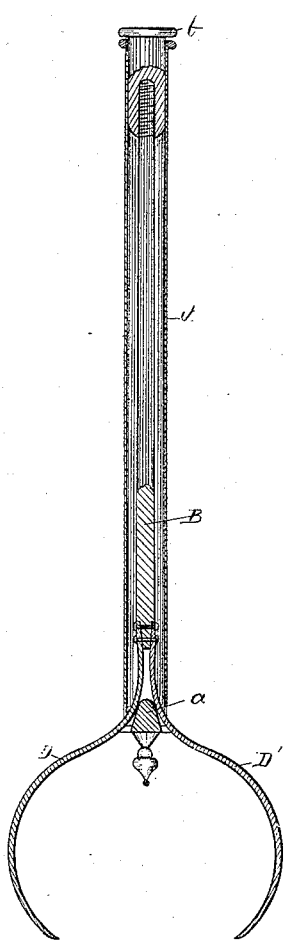
Figure 4:
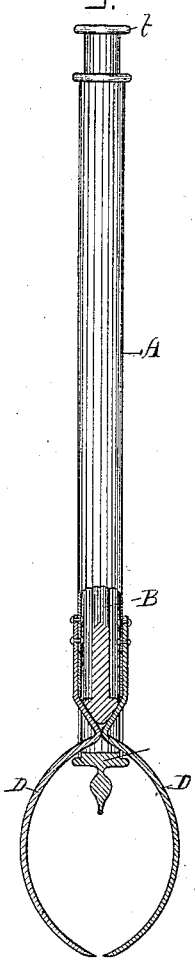
Figure 5:
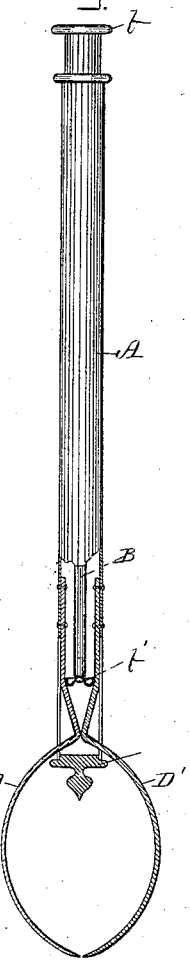
Figure 3:

In the accompanying drawings, which illustrate my invention as embodied in tongs of the class above mentioned in the best ways now known to me, Figure 1 is an elevation of the rod, having two spring-tines secured to its lower end, and a central longitudinal section of its inclosing-handle, the tongs being closed. Fig. 2 shows similar views with the tongs open. Fig. 3 is a bottom view of the hollow handle, showing the slots through which the tines project. Figs. 4 and 5 show the spring-tines secured to the handle, and the lower end of the inclosed rod to actuate them. In these figures the handle is extended sufficiently below the end of the inclosed rod to conceal the working parts.

A is a tube, of any suitable metal, and of a length best adapted to the uses for which the tongs may be intended.

B is a rod inclosed in the tube A, and provided at its upper end with a finger-piece, b, which fits the upper end of the tube A and slides within it. The rod B is depressed to open the tongs by bearing on the finger-piece b.

The tongs consist of two tines, D D', made of suitable spring metal. These tines are rigidly secured to the rod B, as in Figs. 1 and 2, or to the tube A, as in Figs. 4 and 5. The elasticity of the spring-tines causes them to approach each other and force up the rod B, when it is released. It is obvious that various arrangements for causing the tines to separate by depressing the rod B, and for furnishing the proper bearings for the tines to act upon to raise the rod B when left free, might be used without departing from the spirit of my invention. I have shown in Fig. 1 the tines passing through slots in a plate, *a*, (shown in Fig. 3,) which plate is screwed into or otherwise secured to the bottom of the tube A. In Fig. 2, I have shown a cross-piece, *a*, secured to the sides of the lower end of the tube A. In Fig. 4 the tines are fast to the tube A, and the lower end of the rod B is wedge-shaped. In Fig. 5 an auxiliary spring, *b'*, bears on the spring-tines D D', and is attached to the lower end of the rod B. This auxiliary spring, however, is not necessary, but might be useful in some instances. I do not show any link-connection between the rod and the spring-tines, as such is objectionable on account of the necessary pivoted connections; but it is evident that such might be employed with the other features of my invention.

The operation of my improved tongs will be readily understood by reference to the drawings, from which it will be seen that by depressing the rod the tines will be separated, and that on releasing the rod the elasticity of the tines will cause them to approach each other and grasp any article that may be between them, or return the rod to its normal position when left free. It will also be apparent that the tines may be made of any desired shape, to adapt them to any of the various uses for which they may be designed.

The advantages arising from constructing tongs or forks as hereinbefore described are, that all links and pivots are dispensed with, the wearing parts are greatly reduced, thereby increasing the durability of the implement, and a better and simpler spring is provided than the coiled spring heretofore placed around the inclosed rod. An obvious modification of my tongs would be to make one tine non-elastic, and have the other tine move toward it, when left free, by reason of its own elasticity.

I claim as my invention—

The improved tongs or forks hereinbefore described, consisting of a pair of spring-tines normally closed and rigidly secured to their support, a rod inclosed in a hollow handle, and means, such as described, to cause the tines to separate when the rod is depressed, and to cause the rod to be returned to its position by the elasticity of the tines as they approach each other when left free, substantially as set forth.

FRANK H. CILLEY.

Witnesses:
WM. A. COPELAND,
G. B. MAYNADIER.